(12) United States Patent
Higuchi

(10) Patent No.: US 8,781,525 B2
(45) Date of Patent: Jul. 15, 2014

(54) ELECTRONIC APPARATUS, RECEPTION CONTROL METHOD AND RECORDING MEDIUM

(75) Inventor: Kazutoshi Higuchi, Hitachiomiya (JP)

(73) Assignee: NEC Corporation, Tokyo (JP)

( * ) Notice: Subject to any disclaimer, the term of this patent is extended or adjusted under 35 U.S.C. 154(b) by 1663 days.

(21) Appl. No.: 11/503,714

(22) Filed: Aug. 14, 2006

(65) Prior Publication Data
US 2007/0049332 A1   Mar. 1, 2007

(30) Foreign Application Priority Data

Aug. 23, 2005  (JP) ................................ 2005-240804

(51) Int. Cl.
*H04M 1/00* (2006.01)
*H04N 5/64* (2006.01)
(52) U.S. Cl.
USPC ....................................... 455/556.1; 348/838
(58) Field of Classification Search
USPC ....................................... 455/556.1; 348/838
See application file for complete search history.

(56) References Cited

U.S. PATENT DOCUMENTS

| | | | |
|---|---|---|---|
| 4,343,300 A * | 8/1982 | Hattori | 600/109 |
| 6,718,157 B1 * | 4/2004 | Choi | 455/3.01 |
| 6,993,357 B1 * | 1/2006 | Ito et al. | 455/552.1 |
| 7,106,382 B2 * | 9/2006 | Shiotsu | 348/555 |
| 7,305,250 B2 * | 12/2007 | Choi | 455/550.1 |
| 7,317,495 B2 * | 1/2008 | Takahashi | 348/838 |
| 2005/0253973 A1 * | 11/2005 | Adachi et al. | 348/838 |

FOREIGN PATENT DOCUMENTS

| | | |
|---|---|---|
| JP | 10-242886 | 9/1998 |
| JP | 11-308143 | 11/1999 |
| JP | 2003-111004 | 4/2003 |
| JP | 2003-168992 | 6/2003 |
| JP | 2003-244015 | 8/2003 |
| JP | 2004-260552 | 9/2004 |
| JP | 2005-123768 | 5/2005 |

* cited by examiner

*Primary Examiner* — Chikaodili E Anyikire
(74) *Attorney, Agent, or Firm* — Cozen O'Connor

(57) ABSTRACT

In a cellular phone 100, a directional coupler 20 provided between a transmitter for communication 32 and a duplexer 30 extracts a transmitted signal, and a detector 21 detects the signal and detects a transmission power level. Next, the comparator 22 compares a comparison level generated by a base voltage source 23 which generates a base voltage corresponding to a received field strength of a broadcast signal with an output level from the detector 21. When the output level exceeds the comparison level, the comparator generates a selection instruction signal of level 'H,' and switches a path so as to insert a filter between a TV receiving antenna ANT 1 and a TV receiver 13 using an input selection switch 10 and an output selection switch 12. Accordingly, deterioration of viewing quality due to suppressed sensitivity caused by transmission power of wireless communication can be prevented.

6 Claims, 8 Drawing Sheets

US 8,781,525 B2

ELECTRONIC APPARATUS, RECEPTION CONTROL METHOD AND RECORDING MEDIUM

CROSS-REFERENCE TO RELATED APPLICATION

This application is based upon and claims the benefit of priority from the prior Japanese Patent Application No. 2005-240804, filed 23 Aug. 2005, the entire contents of which is incorporated herein by reference.

BACKGROUND OF THE INVENTION

1. Field of the Invention

The present invention relates to an electronic apparatus, a reception control method and a recording medium having a function of receiving a broadcast.

2. Description of the Related Art

In a terrestrial digital TV broadcasting, a transmission band of approximately 6 MHz per channel is divided into 13 segments modulated by OFDM (Orthogonal Frequency Division Multiplexing), and the one segment at the center thereof is allocated for mobile receiving.

Recently, mobile communication terminal units such as cellular phones equipped with a function of receiving a program broadcasted in this segment have been developed. As an apparatus of this type, for example, Japanese Patent Application Laid-Open (Kokai) 2003-111004 discloses an art. More specifically, when a call is started because of generation of an incoming call during program viewing processing, the art starts processing of recording coded video and audio data of the program which is being viewed to SDRAM. Next, when the call is terminated, the art starts reading out the coded video and audio data at the start of the call from the SDRAM, and chases and replays the data while continuing the processing of recording.

Meanwhile, the terrestrial digital TV broadcasting uses a broadcast band ranging from 470 MHz to 770 MHz, which is adjacent to the transmitting frequency of the cellular phones. Accordingly, in the case where a cellular phone transmits wirelessly for communicating with a base station while a TV receiver mounted with a cellular phone is receiving a program, the transmission power suppresses sensitivity of the TV receiver, thereby decreasing receive sensitivity which leads to deterioration of viewing quality.

To avoid such a program, it is possible to provide a filter for attenuating a transmitted wave from the cellular phone in the TV receiver side.

However, a broadcast band used by the terrestrial digital TV broadcasting and a transmitting frequency used by the cellular phone are adjacent to each other, as described above. Therefore, there is a problem of decrease in receive sensitivity due to filter insertion loss, particularly in a high-frequency channel for terrestrial digital TV broadcasting.

SUMMARY OF THE INVENTION

An object of the present invention is to provide an electronic apparatus, a reception control method and a recording medium, with a function of receiving a broadcast, that are capable of preventing suppression of sensitivity of a broadcast receiving frequency caused by transmission and receiving operations of a mobile communication terminal.

To solve the aforementioned problem, an electronic apparatus according to the present invention comprising: a first antenna; a decoding section for decoding data containing at least a video or audio from a first frequency band containing a broadcast signal among a plurality of frequency bands that can be received by the first antenna; a first detection section for detecting a second frequency band containing a signal for communicating with an external wireless communication line contained in the plurality of frequency bands; a first judgment section for, when the first detection section detects the second frequency band, judging whether or not the detected level affects decoding of the broadcast signal by the decoding section, and a control section for executing a control so as to enable receiving the first frequency band preferentially, when it is judged, as a result of determination by the first judgment section, that decoding of the broadcast signal is affected.

In addition, to solve the aforementioned problem, a reception control method according to the present invention comprising the steps of: a decoding step of decoding data containing at least a video or audio from a first frequency band containing a broadcast signal among a plurality of frequency bands that can be received by an antenna; a first detection step of detecting a second frequency band containing a signal for communicating with an external wireless communication line contained in the plurality of frequency bands; a judgment step of, when the first detection step detects the second frequency band, judging whether or not the detected level affects decoding of the broadcast signal by the decoding step; and a control step of executing a control so as to enable receiving the first frequency band preferentially, when it is judged, as a result of determination by the judgment step, that decoding of the broadcast signal is affected.

In addition, to solve the aforementioned problem, a computer program product according to the present invention for storing a reception control program executed by a processor in an electronic apparatus comprising the steps of: a decoding step of decoding data containing at least a video or audio from a first frequency band containing a broadcast signal among a plurality of frequency bands that can be received by an antenna; a first detection step of detecting a second frequency band containing a signal for communicating with an external wireless communication line contained in the plurality of frequency bands; a judgment step of, when the first detection step detects the second frequency band, judging whether or not the detected level affects decoding of the broadcast signal by the decoding step; and a control step of executing a control so as to enable receiving the first frequency band preferentially, when it is judged, as a result of determination by the judgment step, that decoding of the broadcast signal is affected.

In addition, to solve the aforementioned problem, an electronic apparatus according to the present invention comprising: a first antenna; a decoding means for decoding data containing at least a video or audio from a first frequency band containing a broadcast signal among a plurality of frequency bands that can be received by the first antenna; a first detection means for detecting a second frequency band containing a signal for communicating with an external wireless communication line contained in the plurality of frequency bands; a first judgment means for, when the first detection means detects the second frequency band, judging whether or not the detected level affects decoding of the broadcast signal by the decoding means, and a control means for executing a control so as to enable receiving the first frequency band preferentially, when it is judged, as a result of determination by the first judgment means, that decoding of the broadcast signal is affected.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration

Figure 1:
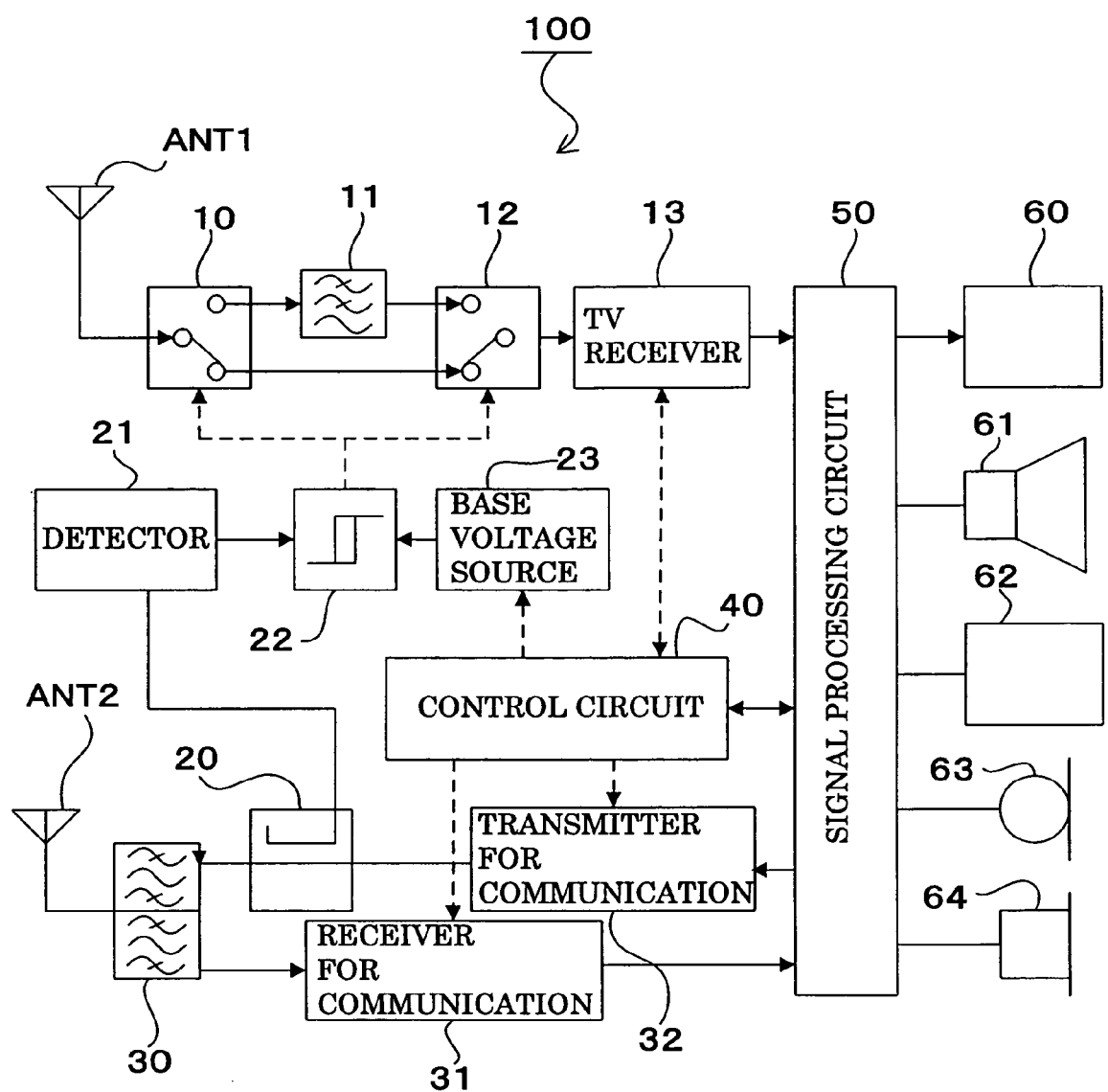
FIG. 1 is a block diagram showing a first embodiment of the present invention.

FIG. 1 is a block diagram showing a configuration of a cellular phone 100 according to a first embodiment of the present invention. The cellular phone 100 shown in FIG. 1, as an electronic apparatus, is roughly divided into a TV reception section, a filter control section and a cellular phone section. The configuration of each section is described below.

<Configuration of TV Reception Section>

The TV reception section is configured by a TV receiving antenna ANT 1, an input selection switch 10, a filter 11, an output selection switch 12, a TV receiver 13, a control circuit 40 which is shared with the cellular phone section (to be described later), a signal processing circuit 50, a display 60, a speaker 61 and a key pad 62. The input selection switch 10 switches a path, in accordance with a selection instruction signal generated by a comparator 22 of the filter control section to be described later, so as to input a broadcast signal received by the TV receiving antenna ANT 1 to the filter 11, or directly input it to the output selection switch 12.

The filter 11 has a characteristic as a low path filter which attenuates the other frequencies. The character allows a frequency band that can be received by the aforementioned TV receiving antenna ANT 1, i.e., 470 MHz to 770 MHz in which a terrestrial digital TV broadcasting is broadcasted out of 470 MHz to 875 MHz as shown in FIG. 2, to pass through.

Figure 2:
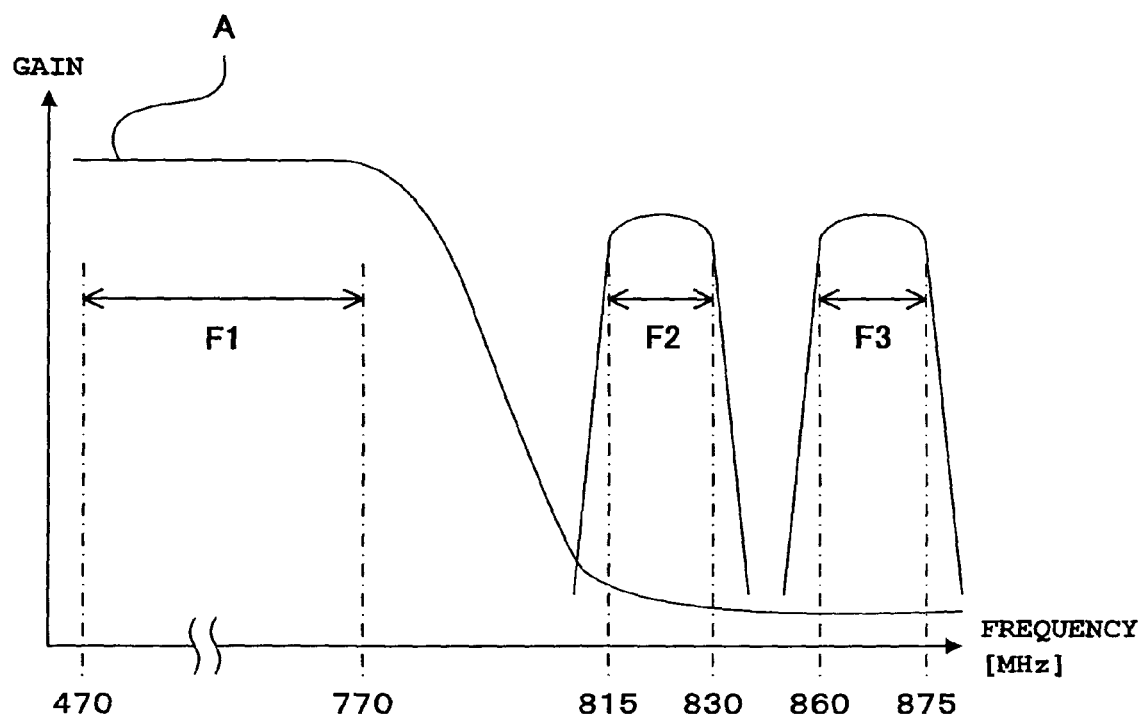
FIG. 2 is a diagram showing a frequency characteristic of a filter 11 and a duplexer 20.

FIG. 2 shows an example of a frequency characteristic of the filter 11. As shown in the diagram, although a filtering characteristic A of the filter 11 allows a terrestrial digital TV broadcast band F1 (470 MHz to 770 MHz) without attenuation, the filtering characteristic A attenuates a transmitting frequency band F2 and a receiving frequency band F3 of the cellular phone that are higher than F1. Practically speaking, 60 to 70 dB of the attenuation is required for the transmitting frequency band F2 and the receiving frequency band F3 of the cellular phone. Accordingly, the filter 11 is designed to meet the requirement. Note that, although the low path filter is used as the filter 11 in the present embodiment, the filter is not limited to the low path filter. For example, a filter of a band elimination type may be used that has a notch characteristic in the transmitting frequency band F2 and the receiving frequency band F3 of the cellular phone.

The output selection switch 12 switches a path so as to select either an output from the filter 11 or an output from the output selection switch 12 in accordance with a selection instruction signal generated by the comparator 22 of the filter control section to be described later. The TV receiver 13 performs an OFDM modulation of a broadcast signal of a channel which the control circuit 40 instructs to select out of the broadcast signals received by the TV receiving antenna ANT 1, separates and extracts a program packet (in the MPEG data format) from a transport stream signal acquired by the modulation, decodes the extracted program packet to video/audio data, and outputs the video/audio data to the signal processing circuit 50. In addition, the TV receiver 13 measures a field strength of the received broadcast signal and outputs it to the control circuit 40. Specifically, it feeds an output from an AGC circuit to the control circuit 40.

The signal processing circuit 50 performs an A/D conversion of the video/audio data fed from the TV receiver 13, displays the video signal acquired by the A/D conversion to a screen of the display 60 as well as amplifies the audio signal and reproduces it from the speaker 61. In addition, the signal processing circuit 50 generates a receive channel number corresponding to a channel selection operation of a user who used the key pad 62, and outputs the receive channel number to the control circuit 40. The control section 40 outputs a channel selection instruction corresponding to the receive channel number fed from the signal processing circuit 50 to the TV receiver 13. In addition, the control circuit 40 generates a base voltage control signal corresponding to the received field strength of the broadcast signal fed from the TV receiver 13, and outputs it to the base voltage source 23 of the filter control section to be described later.

<Configuration of Filter Control Section>

Figure 3:
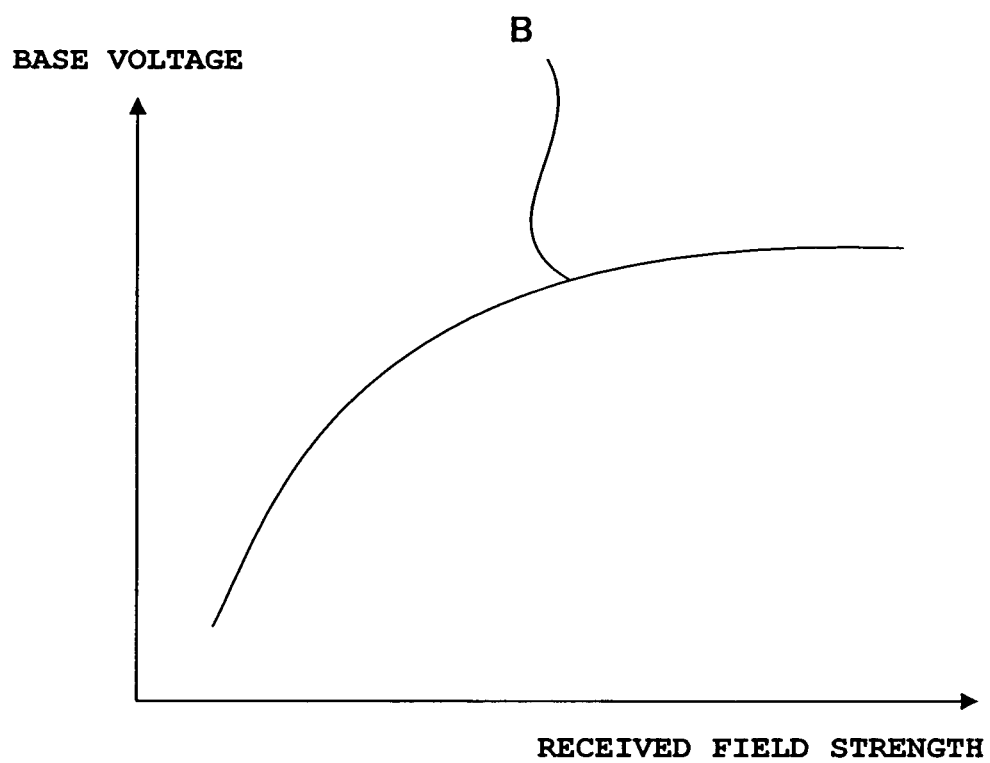
FIG. 3 is a graph showing a relationship between a received field strength and a comparison level.

The filter control section is configured by a directional coupler 20, a detector 21, the comparator 22 and the base voltage source 23. The directional coupler 20 is provided between a transmitter for communication 32 (to be described later) and a duplexer 30 (to be described later) of the cellular phone section, and detects a transmitted signal of the transmitter for communication 32 from a traveling wave component. The detector 21 detects an output from the directional coupler 20 and generates an output level (voltage) corresponding to a transmission electric power of the transmitter for communication 32. The comparator 22 compares the magnitude between an output level from the detector 21 and a comparison level generated by the base voltage source 23 which generates a base voltage corresponding to the received field strength of the broadcast signal. If the output level from the detector 21 exceeds the comparison level, the comparator 22 generates a selection instruction signal of level 'H.' On the other hand, if the output level from the detector 21 does not exceed the comparison level, the comparator 22 generates a selection instruction signal of level 'L'. The base voltage source 23 generates the comparison level of the voltage corresponding to the base voltage control signal fed from the control circuit 40. That is, the base voltage source 23 outputs a comparison level B of the base voltage corresponding to the received field strength of the broadcast signal as shown in FIG. 3.

<Configuration of Cellular Phone Section>

The cellular phone section is configured by a transmitting and receiving antenna for communication ANT 2, the duplexer 30, a receiver for communication 31, the transmitter for communication 32, the control circuit 40, the signal processing circuit 50, a microphone 63 and a receiver 64. The duplexer 30 which also functions as the antenna, having a frequency characteristic of discriminating F2 and F3 shown in FIG. 3, separates a received signal received by the transmitting and receiving antenna for communication ANT 2 and a transmitted signal fed from the transmitter for communication 32 to the transmitting and receiving antenna for communication ANT 2. The receiver for communication 31 outputs to the signal processing circuit 50 audio data acquired by modulating the received signal received via the transmitting and receiving antenna for communication ANT 2 in accordance with the instruction by the control circuit 40.

The transmitter for communication 32 performs high-frequency amplification of the transmitted signal acquired by modulating the audio data fed from the signal processing circuit 50 in accordance with the instruction by the control circuit 40, and sends the amplified signal to the transmitting and receiving antenna for communication ANT 2. Responding to a communication control instruction by the signal processing circuit 50, the control circuit 40 provides the receiver for communication 31 with a receipt instruction and the transmitter for communication 32 with a transmit instruction. The signal processing circuit 50 is configured, for example, with DSP for processing a base band signal, etc. The signal processing circuit 50 generates a communication control instruction corresponding to a user operation using the key pad 62 and outputs it to the control circuit 40, converts the audio data fed from the receiver for communication 31 to the audio signal, and outputs the audio signal to the receiver 64. On top of that, the signal processing circuit 50 converts the audio signal inputted from the microphone 63 to the audio data, and outputs the audio data to the transmitter for communication 32.

A-2. Operation

Next, the operation of the filter control section (the directional coupler 20, the detector 21, the comparator 22 and the base voltage source 23) in the cellular phone 100 with the aforementioned configuration is described. As described above, the filter 11 of the TV reception section has a low path characteristic of allowing the terrestrial digital TV broadcast band to pass through and attenuating the transmission band of the cellular phone section. However, since the broadcast band and the transmission band are adjacent to each other, the receive sensitivity of the TV receiver 13 decreases in the state where the filter 11 is inserted between the TV receiving antenna ANT 1 and the TV receiver 13 (Curve B), compared with the state where the filter 11 is not inserted (Curve C), as shown in FIG. 4.

Figure 4:
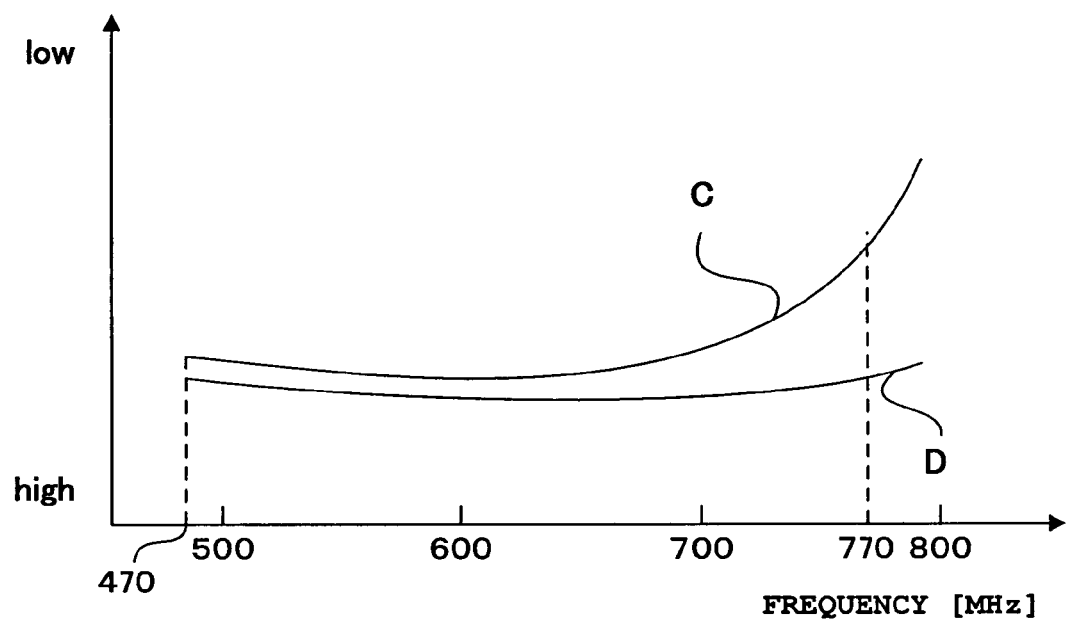
FIG. 4 is a diagram showing a receiver sensitivity characteristic which changes depending on presence or absence of the filter 11.

(Note that, a higher value of the 'receive sensitivity' in the vertical axis in FIG. 4 indicates more significant sensitivity deterioration.)

Figure 5:
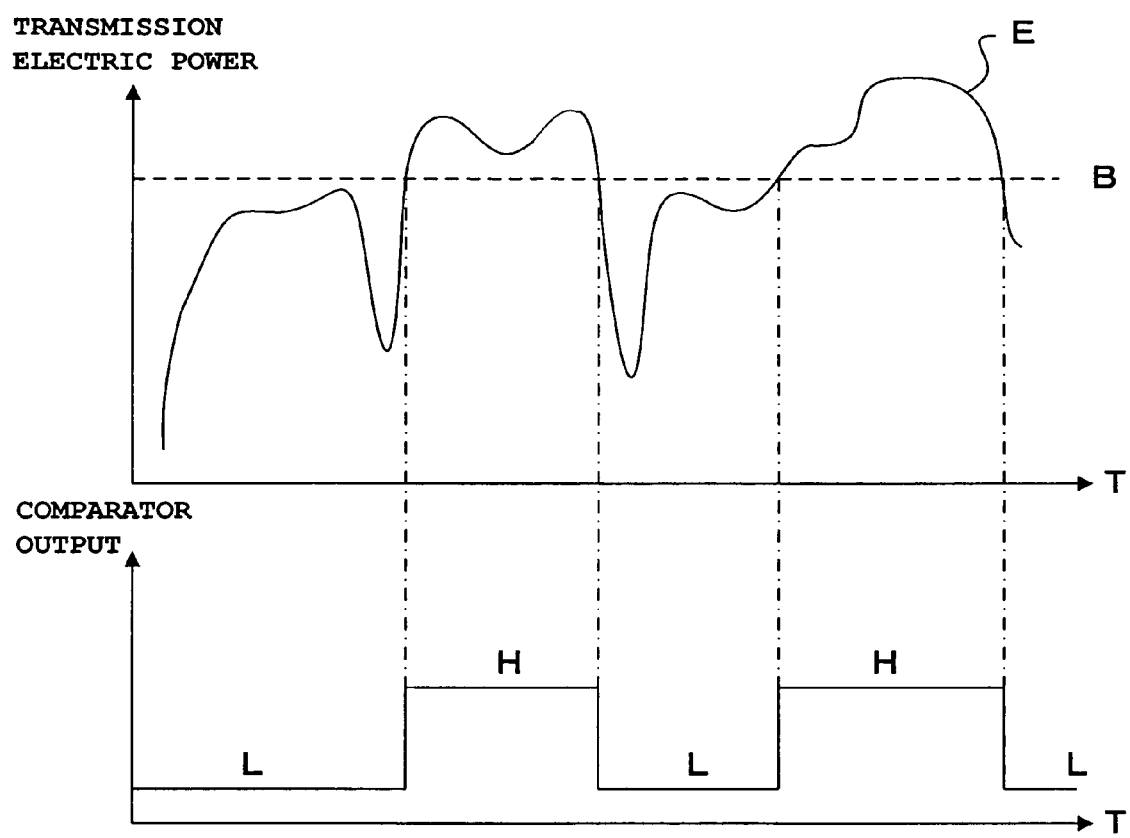
FIG. 5 is a diagram for explaining an operation of a filter control section.

Now, the filter control section compares the magnitude between an output level E from the detector 21 corresponding to the transmission electric power of the cellular phone section and the comparison level B generated by the base voltage source 23 as shown in FIG. 5. If the output level E from the detector 21 exceeds the comparison level B, that is, if the transmission electric power of the cellular phone section has reached the level causing suppression of sensitivity in the TV receiver 13, the comparator 22 generates the selection instruction signal of level 'H.' Upon generation of the selection instruction signal of level 'H' by the comparator 22, the input selection switch 10 and the output selection switch 12 as described above switch paths so as to insert the filter 11 between the TV receiving antenna ANT 1 and the TV receiver 13.

On the other hand, if the transmission output of the cellular phone section has not reached the level causing the suppression of sensitivity in the TV receiver 13, the comparator 22 generates the selection instruction signal of level 'L.' Upon generation of the selection instruction signal of level 'L' by the comparator 22, the input selection switch 10 and the output selection switch 12 as described above switch paths so as to bypass the filter 11 between the TV receiving antenna ANT 1 and the TV receiver 13.

Meanwhile, even in the case where the transmission electric power of the cellular phone has reached the level causing the suppression of sensitivity in the TV receiver 13, if the field strength of the broadcast signal received by the TV receiver 13 is strong, the viewing quality thereof is not significantly deteriorated. Accordingly, the filter control section performs a variable control of the comparison level in accordance with the received field strength of the broadcast signal. By doing this, the transmission power from the cellular phone section and the field strength of the broadcast signal are taken into consideration. In addition, a path is switched so as to insert the filter 11 between the TV receiving antenna ANT 1 and the TV receiver 13, only in the case where decrease in receive sensitivity caused by suppression of sensitivity due to the transmission power of the cellular phone section is more remarkable than decrease in receive sensitivity caused by insertion of the filter 11. Accordingly, deterioration of viewing quality caused by suppression of sensitivity is prevented.

When a path is switched by the input selection switch 10 and the output selection switch 12 as described above, the switching of the path affects a receiving operation of the TV receiver 13. However, the influence remains up to a degree in which an error can be correctable by time interleave and convolution coding that are performed as receive modulation processing of the terrestrial digital TV broadcasting. Accordingly, viewing quality is not deteriorated.

B. Second Embodiment

Figure 6:
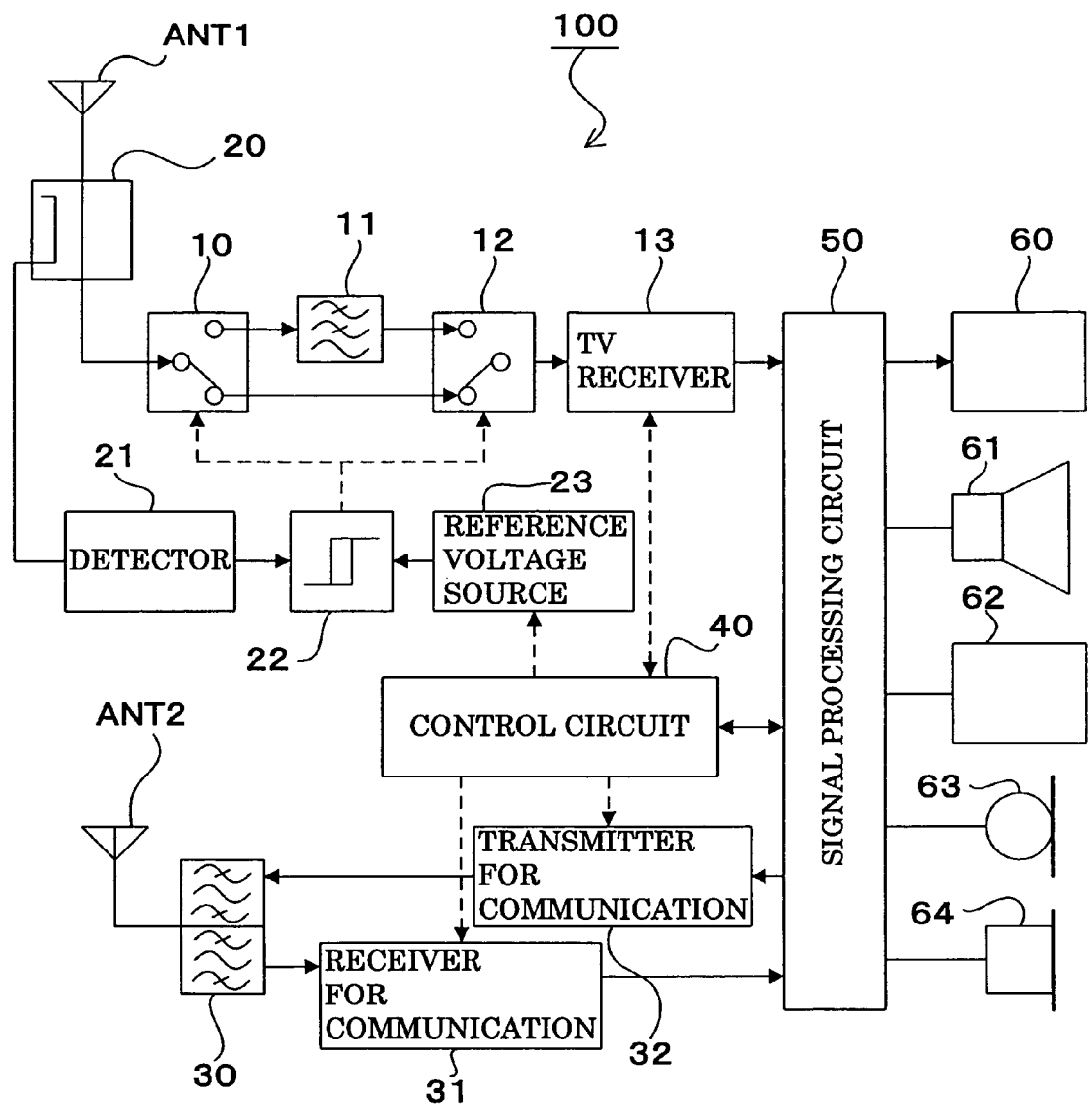
FIG. 6 is a block diagram showing a configuration of a second embodiment of the present invention.

Next, a second embodiment is described with reference to FIG. 6. FIG. 6 is a block diagram showing a configuration of the second embodiment. In FIG. 6, the same reference numerals are provided to elements common to the first embodiment shown in FIG. 1, and the explanation therefore will be omitted. The second embodiment shown in FIG. 6 differs from the first embodiment shown in FIG. 1 in that the directional coupler 20 is provided between the receiving antenna ANT 1 and the input selection switch 10.

The reason for providing the directional coupler 20 between the receiving antenna ANT 1 and the input selection switch 10 is to detect the frequency band from 815 MHz to 830 MHz. This frequency band is included in the frequency band that can be received by the receiving antenna ANT 1 and corresponds to the transmitted signal transmitted by the transmitting and receiving antenna for communication ANT 2.

It is desirable that the transmitted signal strength should be directly detected by the transmitting and receiving antenna for communication ANT 2 as detailed in the first embodiment as above. However, the transmitted signal strength sometimes cannot be accurately detected, for example, in the case where the transmitting and receiving antenna for communication ANT 2 is an elastic type. To address this, the second embodiment aims to detect the transmitted signal strength from the frequency band that can be received by the TV receiving antenna ANT 1.

In the present second embodiment, the directional coupler 20 detects the receiving electric power of the broadcast signal, outputs it to the detector 21, and compares the magnitude between the output level from the detector 21 and the comparison level generated by the base voltage source 23. If the comparison level exceeds the output level from the detector 21, that is, if the signal strength of the frequency band 815 MHz to 830 MHz which can be received by the TV receiving antenna ANT 1 and which corresponds to the transmitted signal has reached the level causing suppression of sensitivity of the frequency band that has to be received by the TV receiver 13, the comparator 22 feeds the selection instruction signal of level 'H' to the input selection switch 10 and the output selection switch 12 and switches a path so as to insert the filter 11 between the TV receiving antenna ANT 1 and the TV receiver 13. Accordingly, for example, in the case that a TV broadcast is being received in the middle of the crowd, direct detection of a level of an interference wave from other cellular phones and execution of a filter control enables preventing a problem of deterioration of viewing quality due to suppression of sensitivity caused by an electric wave from a cellular phone of other person.

C. Third Embodiment

Figure 7:
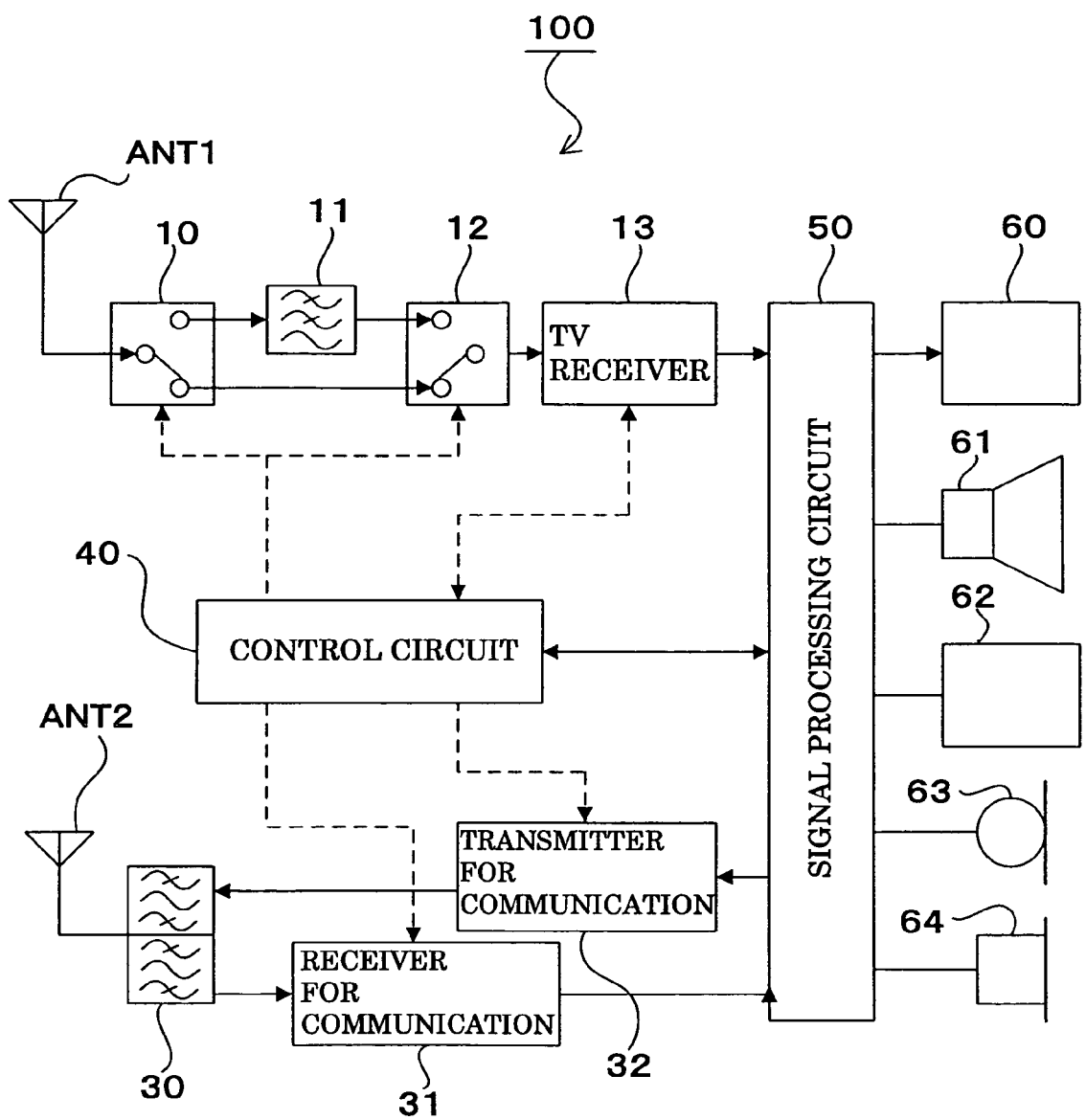
FIG. 7 is a block diagram showing a configuration of a third embodiment of the present invention.

Next, a third embodiment is described with reference to FIGS. 7 and 8. FIG. 7 is a block diagram showing a configuration of the third embodiment. In FIG. 7, the same reference numerals are provided to elements common to the first embodiment shown in FIG. 1, and the explanation therefore will be omitted. The third embodiment shown in FIG. 7 differs from the first embodiment shown in FIG. 1 in that the control section 40 executes filter control processing of determining whether or not to insert the filter 11 between the input selection switch 10 and the output selection switch 12. The operation of the filter control processing executed by the control section 40 is described below with reference to FIG. 8.

Figure 8:
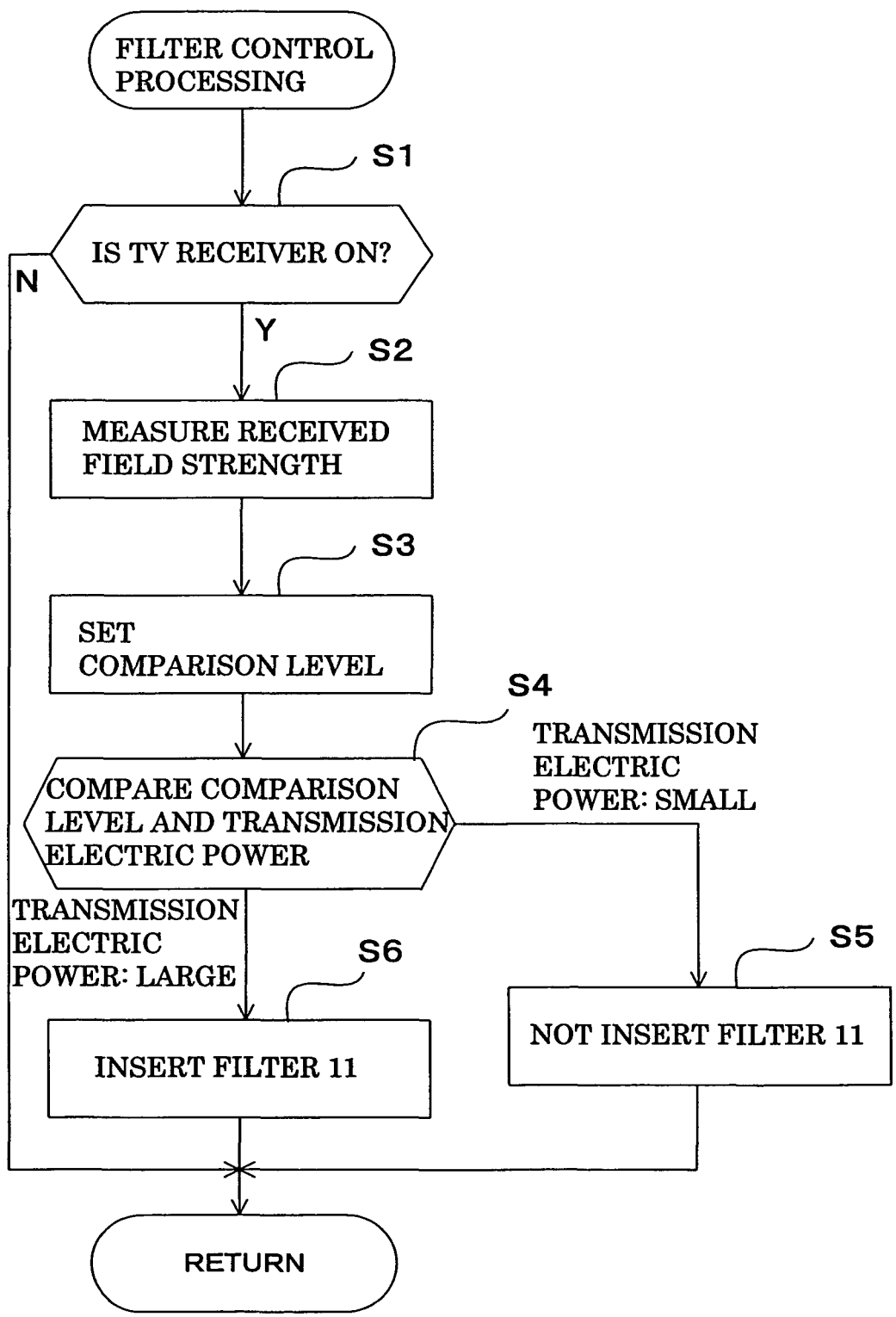
FIG. 8 is a flowchart showing an operation of filter control processing.

The filter control processing shown in FIG. 8 is executed by interruption every predetermined cycle, for example when the cellular phone 100 is set to a power ON state. At the interruption execution timing, the control section 40 advances the process to Step S1 as shown in FIG. 8, where it judges whether or not the TV receiver 13 is in the ON state. If the TV receiver 13 is in the OFF state, there is no need to determine whether or not to insert the filter 11 between the input selection switch 10 and the output selection switch 12. Therefore, the judgment result is 'NO' and the control section 40 completes the processing.

On the other hand, if the TV receiver 13 is in the ON state, it is necessary to determine whether or not to insert the filter 11 between the input selection switch 10 and the output selection switch 12. Therefore, the judgment result is 'YES,' and the process advances to Step S2. In Step S2, the control section 40 measures the received field strength of the broadcast received by the TV receiver 13. Specifically, the control section 40 detects the AGC circuit output level inside the TV receiver 13. Next, in Step S3, the control section 40 sets the comparison level corresponding to the received field strength based on the relationship as shown in FIG. 3. In doing so, a method is used of storing a data table as shown in FIG. 3 in ROM, etc. in advance, and reading out the corresponding comparison level from the data table as a read-out address using the received field strength measured in the aforementioned Step S2.

Next, in Step S4, the control section 40 compares the comparison level set in the aforementioned Step S3 with the transmission electric power level of the cellular phone section. Since the control section 40 manages the transmission electric power level of the transmitter for communication 32 for controlling communications with the base station side, it compares the magnitude between the transmission electric power level thereof and the comparison level. Next, if the transmission electric power level is smaller than the comparison level, the process advances to Step S5. In Step S5, the control section 40 switches a path of the input selection switch 10 and the output selection switch 12 so as to bypass the filter 11 between the TV receiving antenna ANT 1 and the TV receiver 13, and terminates the processing.

On the other hand, if the transmission electric power level is larger than the comparison level, the process advances to Step 6. In Step 6, after switching a path of the input selection switch 10 and the output selection switch 12 so as to insert the filter 11 between the TV receiving antenna ANT 1 and the TV receiver 13, the control section 40 terminates the processing. Accordingly, deterioration of viewing quality caused by suppression of sensitivity due to the transmission power of the cellular phone section can be avoided. In addition, it is possible to eliminate the filter control section (the directional coupler 20, the detector 21, the comparator 22 and the base voltage source 23) that is provided in the first and second embodiments, thereby enabling reducing the cost.

Note that in the embodiments, description was given on a system in which the terrestrial digital TV broadcast band and the transmission band of the cellular phone section are adjacent to each other. However, the present invention is not limited to the system, and a system may be used in which the terrestrial digital TV broadcast band and the receive band of the cellular phone section are adjacent to each other. In this case, the directional coupler 20 may be provided between the duplexer 30 and the receiver for communication 31 and detection may be made in the direction opposite to the direction in the case of FIG. 1.

Furthermore, although the processing program of the cellular phone which is a preferred embodiment of the present invention is stored in the memory (for example, ROM, etc.) of the cellular phone, this processing program is stored on a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. A communication terminal device including a broadcast receiver for receiving a broadcast signal inputted through a reception path including an antenna, and a communicator for transmitting and receiving a wireless signal, comprising:
    a filter configured to pass a frequency band of the broadcast signal received by the broadcast receiver;
    a transmission power detector for detecting a transmission power of the wireless signal transmitted from the communicator and generating a transmission power level indicating the transmission power;

a field strength detector for detecting a received field strength of the broadcast signal received by the broadcast receiver;

a base voltage generator for generating as a comparison level a base voltage for a transmission power of a wireless signal transmitted from the communicator corresponding to the received field strength detected by the field strength detector, based on a prestored relationship between a received field strength of a broadcast signal received by the broadcast receiver and a comparison level beyond which a transmission power of a wireless signal transmitted from the communicator suppresses sensitivity of the broadcast receiver;

a judging unit for judging whether or not the transmission power of the wireless signal transmitted from the communicator causes suppression of sensitivity in the broadcast receiver based on whether or not the transmission power level generated by the transmission power detector exceeds the comparison level generated by the base voltage generator; and a filter controller for inserting the filter into the reception path of the broadcast receiver when judged by the judging unit that the transmission power causes suppression of sensitivity and removing the filter from the reception path of the broadcast receiver when judged by the judging unit that the transmission power does not cause suppression of sensitivity.

2. The communication terminal device according to claim 1, wherein the filter controller includes a first path switch and a second path switch provided in the reception path of the broadcast receiver, and an instructor configured to instruct the first path switch and the second path switch for inserting the filter into the reception path when judged by the judging unit that the transmission power causes suppression of sensitivity, and to instruct the first path switch and the second path switch for allowing the filter to bypass the reception path when judged by the judging unit that the transmission power does not cause suppression of sensitivity.

3. The communication terminal device according to claim 1, wherein the transmission power detector is configured to extract the wireless signal by a directional coupler provided in a transmission path of the communicator and generates the transmission power level that indicates the transmission power by detecting the wireless signal extracted.

4. The communication terminal device according to claim 1, wherein the transmission power detector is configured to:
extract the wireless signal by a directional coupler provided in the reception path of the broadcast receiver, and
generate the transmission power level that indicates the transmission power by detecting the wireless signal extracted.

5. A communication control method of an electronic device including a broadcast reception section for receiving a broadcast signal input through a reception path including an antenna and a communication section for transmitting and receiving a wireless signal, the method comprising:

a filtering step for allowing a frequency band of the broadcast signal received by the broadcast reception section to pass through;

a transmission power detecting step to detect a transmission power of the wireless signal transmitted from the communication section and generate a transmission power level indicating the transmission power;

a field strength detecting step to detect a received field strength of the broadcast signal received by the broadcast reception section;

a base voltage generating step to generate as a comparison level a base voltage for a transmission power of a wireless signal transmitted from the communication section corresponding to the received field strength of the broadcast signal received by the broadcast reception section based on a prestored relationship between a received field strength of a broadcast signal received by the broadcast reception section and a comparison level beyond which a transmission power of the wireless signal transmitted from the communication section suppresses sensitivity of the broadcast reception section;

a judging step to judge whether or not the transmission power of the wireless signal transmitted from the communication section causes suppression of sensitivity in the broadcast reception section based on whether or not the transmission power level generated in the transmission power detecting step exceeds the comparison level generated in the base voltage generating step; and a filter controlling step to insert the filtering step into the reception path of the broadcast reception section when judged in the judging step that the transmission power causes suppression of sensitivity and to remove the filtering step from the reception path of the broadcast receiver when judged by the judging unit that the transmission power does not cause suppression of sensitivity.

6. A communication control program stored on a non-transitory computer readable medium for enabling a computer to function as:

a transmission power detector for detecting a transmission power of a wireless signal transmitted from a communication section, and generating a transmission power level indicating the transmission power;

a field strength detector for detecting a received field strength of a broadcast signal received by a broadcast reception section;

a base voltage generator for generating as a comparison level a base voltage for a transmission power of a wireless signal transmitted from the communication section corresponding to the received field strength of the broadcast signal received by the broadcast reception section based on a prestored relationship between a received field strength of a broadcast signal received by the broadcast reception section and a comparison level beyond which a transmission power of the wireless signal transmitted from the communication section suppresses sensitivity of the broadcast reception section;

a judging unit for judging whether or not the transmission power of the wireless signal transmitted from the communication section causes suppression of sensitivity in the broadcast reception section based on whether or not the transmission power level generated by the transmission power detector exceeds the comparison level generated by the base voltage generator; and a filter controller for inserting, into a reception path of the broadcast reception section, a filter that attenuates the wireless signal by allowing a frequency band of the broadcast signal to pass through when judged by the judging unit that the transmission power causes suppression of sensitivity and for removing, from the reception path of the broadcast reception section, the filter when judged by the judging unit that the transmission power does not cause suppression of sensitivity.

* * * * *